United States Patent [19]

Tawara et al.

[11] Patent Number: 4,981,832

[45] Date of Patent: Jan. 1, 1991

[54] CATALYST COMPOSITION FOR HYDROGENATION OF HEAVY HYDROCARBON OIL AND PROCESS FOR PRODUCING THE CATALYST

[75] Inventors: Kinya Tawara, Saitama; Kazuyoshi Kudoh; Kazushi Usui, both of Chiba; Tomohiro Yoshinari; Shigenori Nakashizu, both of Saitama, all of Japan

[73] Assignee: Research Association for Residual Oil Processing, Tokyo, Japan

[21] Appl. No.: 374,805

[22] Filed: Jul. 3, 1989

[30] Foreign Application Priority Data

Jul. 1, 1988 [JP] Japan ................... 63-164208

[51] Int. Cl.$^5$ ............. B01J 21/04; B01J 23/85
[52] U.S. Cl. ................... 502/314; 502/313; 502/320; 502/322; 502/323
[58] Field of Search ............... 502/314, 313, 320, 322, 502/323

[56] References Cited

U.S. PATENT DOCUMENTS

| | | | |
|---|---|---|---|
| 4,082,695 | 4/1978 | Rosinski et al. | 502/314 X |
| 4,257,922 | 3/1981 | Kim et al. | 502/314 X |
| 4,341,625 | 7/1982 | Tamm | 502/314 X |
| 4,460,707 | 7/1984 | Simpson | 502/314 X |

Primary Examiner—W. J. Shine
Attorney, Agent, or Firm—Sughrue, Mion, Zinn, Macpeak & Seas

[57] ABSTRACT

A catalyst composition for the hydrogenation of heavy hydrocarbon oil, where the catalyst composition comprises at least one active ingredient for hydrogenation supported on a porous alumina carrier and has the following characteristics: (1) the total volume of the pores therein is from 0.4 to 1.0 ml/g; (2) the mean pore diameter of pores having a pore diameter of from 5 to 400 Å is from 60 to 140 Å; (3) the volume of pores having a pore size within ±25% of the mean pore diameter of pores having a pore diameter of from 5 to 400 Å is from 60 to 98% of the volume of pores having a pore diameter of from 5 to 400 Å; (4) the volume of pores having a pore diameter of from 400 to 5000 Å is from 2 to 9% of the total volume of the entire pores; (5) the ratio ($mm^2/mm^3$) of the outer surface area of a molded catalyst powder to the volume thereof is from 4 to 8; and (6) all points in the interior of the molded catalyst particle are positioned within 0.05 to 0.6 mm from the outer surface thereof. A process for producing the catalyst composition is also disclosed. Further, a process for hydrogenating heavy hydrocarbon oil, which comprises contacting the heavy hydrocarbon oil with the catalyst composition in the presence of hydrogen is disclosed.

28 Claims, 1 Drawing Sheet

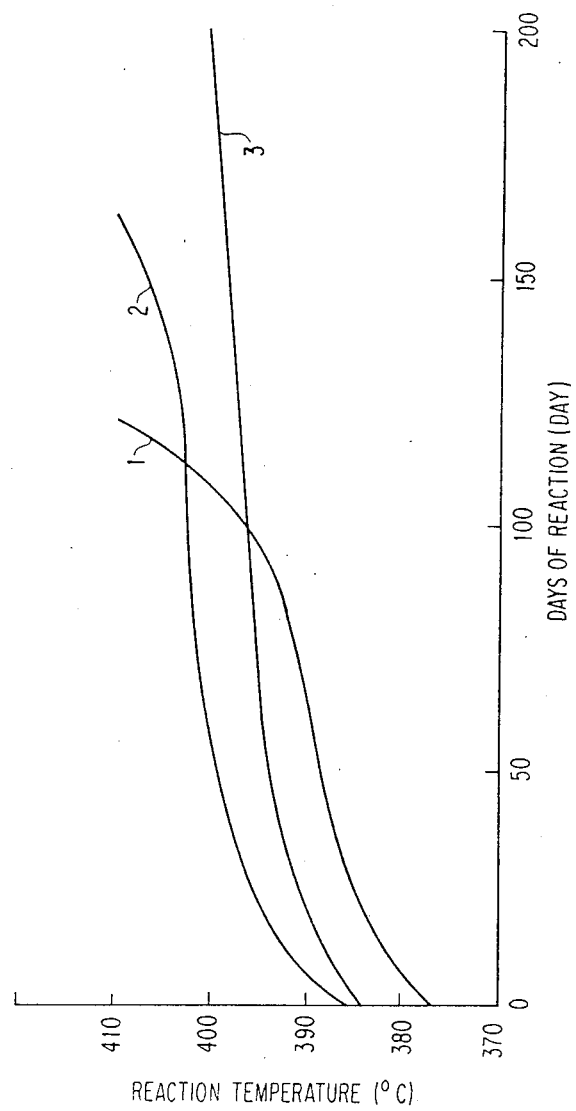

CATALYST COMPOSITION FOR HYDROGENATION OF HEAVY HYDROCARBON OIL AND PROCESS FOR PRODUCING THE CATALYST

FIELD OF THE INVENTION

This invention relates to hydrogenation of heavy hydrocarbon oil and, more particularly, to a catalyst composition for the hydrogenation of heavy hydrocarbon oil, which has a minor portion (about 2 to 9%) of macropores and a relatively major portion (about 91 to 98% of micropores. It also relates to a process for hydrogenating heavy hydrocarbon oil in the presence of such a catalyst composition to desulfurize such oil or to remove asphaltene or metals.

BACKGROUND OF THE INVENTION

Processes for hydrogenating heavy hydrocarbon oil (hereinafter referred to simply as heavy oil) containing large amounts of asphaltene and/or heavy metals such as nickel and vanadium to convert the heavy oil into desulfurized hydrocarbon oil having a low asphaltene and/or heavy metals content (and great added value) have been widely investigated.

When heavy oil is hydrogenated, the loading of materials per unit quantity of catalyst which can poison the catalyst is high due to the presence of asphaltene and/or heavy metal compounds which are present at high concentrations in the heavy oil so that the activity of the catalyst is rapidly decreased in a short period of time. Asphaltene dispersed as colloidal particles in the heavy oil is a macromolecule. Thus, when conventional desulfurization catalysts are used, asphaltene has high resistance to the diffusion of oil into the catalyst particles and coke is formed in high quantities on the surfaces of the catalyst particles. Thus, catalyst activity is rapidly decreased and the course of the reactions is obstructed in a short period of time. Further, heavy metals such as nickel and vanadium in the heavy oil are deposited on the surfaces of the catalyst particles and the catalysts are also thereby poisoned, i.e., catalyst activity is rapidly decreased. Therefore, the catalysts must be replaced by fresh catalysts and costs are increased. In some cases, heavy oil is no longer treated at many plants.

DESCRIPTION OF THE PRIOR ART

In carrying out the hydrodesulfurization of heavy oil of relatively good quality which has a asphaltene content of not higher than about 2 wt % and a heavy metal content of not higher than about 50 wt ppm by conventional processes, hydrodesulfurization catalysts having pores of a relatively small pore size of about 60 to 100 Å are used. (Unless otherwise indicated hereinafter, % and ppm are by weight in the present invention.) In the hydrodesulfurization of heavy oil containing large amounts of asphaltene and heavy metals such as heavy oil having an asphaltene content of as high as more than about 3% and a heavy metal content of as high as more than about 50 ppm, materials which poison the catalyst are deposited in substantial amounts by the presence of asphaltene as a high molecular weight colloid or the heavy metal compounds, catalyst activity is decreased and the catalysts are deteriorated to such an extent that they can no longer be used. When the deteriorated catalysts are removed and analyzed, it can be seen that vanadium and nickel are deposited on the surface layers of the catalyst particles, pores on the surface layers are clogged and heavy oil can not be diffused in the interior of the catalyst particles. Accordingly, it is necessary to adjust the pore size distribution of the catalyst and to improve the shape of the molded catalyst so as to allow the diffusion and penetration of the heavy oil into the interior of the catalyst particles to be properly catalyzed according to the asphaltene content or the content and the molecular structures of the heavy metal compounds. This is because the catalysts are poisoned in the hydrogenation of heavy oil by the asphaltene and the heavy metal compounds.

Attempts have been made to charge catalysts having a large pore size for removing only metals into the first stage of a reactor, this stage accounting for 10 to 50% of the total capacity of the reactor, to solve the above problem. However, this involves a serious disadvantage. Since the pore size of the catalyst charged into the first stage is large, the active surface area of the catalyst is small and the desulfurization ability of the reactor is low as a whole from the start.

In the specifications of JP-B-No. 47-40683 (the term "JP-B" as used herein means an "examined Japanese patent publication"), JP-A-No. 54-125192 (the term "JP-A" as used herein means an "unexamined published Japanese patent application") and JP-A-No. 57-201533, there have been proposed catalysts where passages only for diffusion are provided in the interior of the catalysts particles to diffuse raw oil into the interior of the catalyst particles (without greatly enlarging pore size) to solve the above problem.

In JP-B-No. 47-40683, a large diameter passage having a size of 100 to 1000 Å or larger only for diffusion accounts for 20 to 30% of the total pores, and in other two applications, a large diameter passage having a size of about 500 Å or larger accounts for about 10 to 30% of the total pores so that the life of the catalyst is prolonged and the desulfurization ability is improved, even when metals are deposited on the catalyst. However, the large diameter passage which are only for diffusion are themselves merely spaces which have no reaction activity and such spaces account for 10 to 30% of the whole of the pores. Thus, the provision of such spaces only for diffusion removes areas of catalytic activity which should be as large as possible.

SUMMARY OF THE INVENTION

The present inventors performed research to solve the problems associated with the prior art mentioned above. As a result, they surprisingly found that a catalyst composition suitable for use as a catalyst composition for the hydrogenation of heavy oil which can retain its activity over a long period of time (without deteriorating in desulfurization activity even when metals are deposited thereon) should have a specific structure. Namely, such a catalyst has a major proportion (about 91 to 98%) of micropores, and a small portion (about 2 to 9% of the whole volume of the entire pores) of macropores. Also, the ratio ($mm^2/mm^3$) of the outer surface area to the volume of the molded catalyst particles is 4 to 8 and all points within the molded catalyst particles are positioned within 0.6 mm from the outer surfaces of the molded catalyst particles. The present invention was reached on the basis of the above findings.

An object of the present invention is to provide a novel bifunctional catalyst which also serves as a conventional catalyst for desulfurization or for the removal of metals or as a catalyst having both functions.

Accordingly, the present invention provides in one aspect a catalyst composition for the hydrogenation of heavy hydrocarbon oil characterized by such a catalyst composition comprising at least one active ingredient for hydrogenation supported on a porous alumina carrier and has the following characteristics:

(1) the total volume of the pores in the catalyst is from 0.4 to 1.0 ml/g;
(2) the mean pore diameter of pores having a pore diameter of from 5 to 400 Å is in the range of 60 to 140 Å;
(3) the volume of pores having a pore size within ±25% of the mean pore diameter of pores having a pore diameter of from 5 to 400 Å is from 60 to 98% of the volume of pores having a pore diameter of from 5 to 400 Å;
(4) the volume of pores having a pore diameter of from 400 to 5000 Å is from 2 to 9% of the total volume of pores;
(5) the ratio (mm$^2$/mm$^3$) of the outer surface area of a molded catalyst particle to the volume thereof is in the range of 4 to 8; and
(6) all points within the molded catalyst particle are within 0.05 to 0.6 mm from the outer surface of the molded catalyst particle.

The present invention provides in another aspect a process for hydrogenating heavy hydrocarbon oil in the presence of such a catalyst composition.

BRIEF DESCRIPTION OF THE DRAWING

The FIGURE is a graph obtained by plotting reaction temperature versus days of reaction when the reaction temperature is controlled so that the sulfur content of the reaction product oil is 0.6 wt % in the relative life test of a hydrodesulfurization catalyst composed of a combination of the catalyst composition of the present invention with a conventional desulfurization catalyst.
1. Comparative Example 1
2. Comparative Example 4/Comparative Example 1 (volume ratio: 40/60)
3. Example 1/Comparative Example 1 (volume ratio: 40/60)

DETAILED DESCRIPTION OF THE INVENTION

The present invention is illustrated in more detail below.

The catalyst composition of the present invention comprises at least one active ingredient for hydrogenation supported on porous alumina and the total volume of the pores thereof is at least about 0.4 ml/g, preferably from about 0.4 to 1.0 ml/g. When the ratio of the total volume of the pores to that of the total catalyst composition is too low, the ability of retaining metals is poor and the catalyst composition is not suitable for practical use.

The term "the total volume of pores" as used herein refers to the measured value obtained by measuring the total volume of the pores with a mercury porosimeter at 4225 kg/cm$^2$·G (60,000 psi), because it is impossible to measure all of the volume of the actual pores. The relation of the pressure (0 to 4225 kg/cm$^2$·G) of the mercury porosimeter to the amount of mercury absorbed by the catalyst is determined. Next by the equation of Washburn et al as below, the presure corresponding to 400 Å and the amount of mercury absorbed are determined to thereby determine the volume of the pores having a diameter of not greater than 400 Å and the volume of the pores having a diameter of not lesser than 400 Å. Further, the mean pore diameter of the pores having a diameter of not greater than 400 Å is determined from the pressure at which mercury in an amount corresponding to $\frac{1}{2}$ of the volume of the pores having a diameter of not larger than 400 Å is absorbed.

$$rP = -2\gamma\cos\theta$$

wherein r is the pore radius, $\gamma$ is the surface tension of mercury (475 dyne/cm), $\theta$ is 130 degrees, which is the contact angle of mercury and a solid, and P is the pressure of a mercury porosimeter.

In the catalyst composition of the present invention, the mean pore diameter of the pores having a pore diameter of about 5 to 400 Å (hereinafter referred to as micropores) is from about 60 to 140 Å, preferably from about 70 to 120 Å. When the mean pore diameter is too small, the diffusibility of heavy oil in the pores becomes poor, while when the mean pore diameter is too large, desulfurization activity is decreased and such pore size does not provide the objects of the invention. The choice of the mean pore diameter from among 60 to 140 Å varies depending on the degree of heaviness of the hydrocarbon to be hydrogenated. For example, a mean pore diameter of the micropores of about 70 to 100 Å is preferred in treating Middle Eastern topping residual oil, and a mean pore diameter of the micropores of about 90 to 140 Å is preferred in treating Middle Eastern vacuum residual oil.

In the catalyst composition of the present invention, the volume of the pores having a pore size within ± about 25% of the mean pore diameter of the micropores is from about 60 to 98% of the total volume of the micropores. When the ratio of the volume of the pores having a pore size within ± about 25% of the mean pore diameter is too low, the ratio of the pores favorable for desulfurization is reduced and the desulfurization activity is decreased.

In the catalyst composition of the present invention, the volume of the pores having a pore diameter of about 400 to 5000 Å (hereafter referred to as macropores) is from about 2 to 9%, preferably from about 3 to 9%, of the total volume of the entire pores. When the ratio of the macropores exceeds the above range, the density of the catalyst is lowered, the active area per unit volume is reduced and, as a result, the desulfurization activity is decreased. Further, the strength of the carrier or the resulting catalyst particles is low and the catalyst is not practicable.

The macropores may have a broad diameter distribution without any particular limitation. The mean diameter of the macropores is generally in the range of about 500 to 5000 Å. The macropores may, if desired, have a sharp diameter distribution to give a narrow value of about 400 to 1000 Å. When the ratio of the macropores is not higher than about 2% of the total volume of the entire pores, resistance to the deposition of nickel and vanadium is deteriorated.

The ratio (mm$^2$/mm$^3$) of the outer surface area of the molded catalyst particles to the volume of the molded catalyst particles in the catalyst composition of the present invention is from about 4 to 8.

The outer surface area was calculated as follows. 50 catalyst particles were arbitrarily taken. The cross sections thereof were measured with a microscope, the lengths thereof (in the case of a rod like shape molded by an extruder, the length is its longer direction) were then measured and the outer surface area was determined from the mean values by the followiong equation.

Mean length=Total of the longer directions of 50 catalyst particles/50

The outer surface area=Mean cross section area×Mean length (in the case of a rod-like shape)

When the ratio (mm$^2$/mm$^3$) of the outer surface area to the volume is lower than about 4, sufficient effects cannot be obtained, while when the ratio is higher than about 8, the outer surface area is too large, the molded catalyst particles are bulky, the packing density of the catalyst in the reactor is low and the desulfurization activity is decreased.

Further, all points within the molded catalyst particles in the catalyst composition of the present invention are positioned within about 0.6 mm, preferably within 0.5 mm, from the outer surfaces of the molded catalyst particles. When the catalyst particles do not meet the above requirements, the life of the catalyst is shortened by vanadium or nickel deposited in the hydrogenation of the heavy hydrocarbon. The shapes of the molded catalyst particles meeting these requirements are preferably a prismatic form, a dumbell form where two circlets are put together, a form where circlets are put in the form of a trefoil and a form where circlets are put in the form of a quatrefoil. The circlet are not always truely round and may be in the form of an oval or nearly a rectangle, a square or a rhombus. The cross-section of the catalyst may be in any form of a hollow column, a letter-shaped prism such as T-, I-, C-, E- or a □-shaped prism or may be triangular, quadrangular, pentagonal, hexagonal or an octagonal honeycomb or prismatic shape.

Any conventional active catalytic ingredients for hydrogenation can be used as the active metals of hydrogenation catalysts to be supported on the porous alumina carrier. For example, there can be used at least one member selected from the group consisting of metals (e.g., chromium, molybdenum, tungsten) of Group VI of the Periodic Table or compounds of these metals and/or at least one member selected from the group consisting of metals (e.g., iron, cobalt, nickel, platinum) of Group VIII of the Periodic Table or compounds of these metals.

Examples of the heavy oil to be treated in the present invention include topping residual oil and vacuum residues of crude oil, synthetic oil obtained by subjecting oil shale, tar sand or bitumen to extraction, desulfurized heavy oil obtained by directly treating crude oil in a desulfurizing apparatus, deasphalted oil obtained by treating crude oil in a solvent deasphalting apparatus, product oil from the liquefaction of coal, residual oil obtained from these processes and mixed oils thereof. Generally, these heavy oils contain asphaltene; heavy metals, sulfur compounds, nitrogen compounds, etc.

Examples of these heavy oils include topping residual oil (specific gravity (D15/4): 0.9881, asphaltene: 7.12%, Ni: 43 ppm, V: 110 ppm, sulfur: 4.31%, nitrogen: 3100 ppm) of crude oil (Arabian heavy) from the Middle east; topping residual oil (specific gravity (D15/4): 0.9888, asphaltene: 8.05%, Ni: 30 ppm, V: 93 ppm, sulfur: 4.410%, nitrogen: 3000 ppm) of crude oil (Khafji) from the Middle east; vacuum residual oil (specific gravity (D15/4): 1.03, asphaltene: 8.9%, Ni: 130 ppm, V: 450 ppm, nitrogen : 7800 ppm) of crude oil (Iranian heavy) from the Middle east; and crude oil (specific gravity (D15/4): 1.004, asphaltene: 11.8%, Ni: 300 ppm, V: 1250 ppm, sulfur: 5.36%, nitrogen: 5750 ppm) from South America (Boscan).

Other examples of heavy oils include oil sand oil (specific gravity (D15/4): 0.9996, asphaltene: 7.9%, Ni: 71 ppm, V: 250 ppm, sulfur: 4.8%, nitrogen: 3800 ppm) from Athabasca, Canada; oil sand oil (specific gravity (D15/4): 1.0078, asphaltene: 8.6%, Ni: 74 ppm, V: 180 ppm, sulfur: 4.5%, nitrogen: 4200 ppm) from Cold Lake, Canada; oil sand oil (specific gravity (D15/4): 1.0131, asphaltene: 10.2%, Ni: 100 ppm, V: 470 ppm, sulfur: 3.4%, nitrogen: 6300 ppm) from Cerro Negro, Venezuela; and oil shale oil (specific gravity (D15/4): 0.8894, asphaltene: 0.55%, Ni: 1000 ppm, V: 3400 ppm, sulfur: 4.5%, nitrogen: 11500 ppm) from Landor, Australia.

As earlier described, these heavy oils contain large amounts of asphaltene (for example, from about 2 to 20%), sulfur compounds and nitrogen compounds and/or heavy metal compounds such as nickel and vanadium compounds (for example, from about 50 ppm to 0.2%).

The above-described catalysts can be prepared by conventional methods.

The alumina carrier can be prepared by neutralizing an aluminum-salt such as aluminum sulfate or aluminum nitrate with a base such as ammonia, or neutralizing an aluminate such as sodium aluminate with an acid aluminum salt or an acid, washing the resulting gel (containing aluminum hydroxide) and carrying out conventional treatments such as heating, aging, molding, drying and calcining.

The micropores can be formed as follows: In the above preparation, aqueous aluminate and aqueous aluminum sulfate are adjusted to a pH of about 9.0 to 10. After filtration, aqueous ammonia is added to the obtained filtrate to adjust the pH to 12 and the same is heated and ripened at about 95° C. for about 20 hours. The important factors are the temperature and the heating and ripening time. In a case of high temperature and a long time, the pore particles tend to become large.

The macropores can be formed, for example, by adding a material which can be removed by calcining (firing), such as carbon black, wheat flour, corn starch, rubber or a synthetic resin, to the catalyst carrier during molding, molding the mixture and firing to remove the additive. Alternatively, the macropores can be formed by previously molding catalyst or carrier particles containing substantially only pores having a pore diameter of about 60 to 140 Å, crushing them into a powder having an appropriate particle size and re-molding the powder to form macropores composed of gaps between particles. The most preferred method in the present invention is such that the molding pressure applied to aluminum hydroxide powder serving as a precursor or the aluminum hydroxide powder containing active metals for hydrogenation is controlled so as to form about 2 to 9% of the macropores.

Examples of active ingredients supported on the carrier include metals (e.g., chromium, molybdenum, tungsten, etc.) of Group VI of the Periodic Table, metals (e.g., cobalt, nickel, iron, platinum, etc.) of Group VIII thereof and mixtures thereof. These metallic components can be supported on the alumina carrier (or alumina gel) by conventional methods. For example, these active ingredients for hydrogenation can be supported on the carrier by bringing a solution containing the active ingredients into contact with the carrier, for example, by immersing the carrier in the solution, kneading the carrier with the solution, allowing the solution to drop on the carrier, or depositing the active ingredients on the carrier by immersing the carrier in the solution and adding a precipitation medium thereto. When metals of Group VI and Group VIII are used in combination, either one may be supported on the carrier and then the other may be supported thereon. Alternatively, both may be simultaneously supported on the carrier.

There will now be illustrated the case where molybdenum as the metal of Group IV and nickel as the metal of Group VIII are supported on the carrier. Examples of nickel compounds which can be used in solutions include nickel nitrate, sulfate, fluoride, chloride, bromide, acetate, carbonate and phosphate. Examples of molybdenum compounds which can be used in solutions include ammonium paramolybdate, molybdic acid, ammonium molybdate, ammonium phosphomolybdate and phosphomolybdic acid.

It is preferred by carry out molding, drying, firing (or calcination), etc., in a conventional manner after the active metal depositing treatment. It is preferred that drying be carried out by keeping the catalyst at a temperature of from room temperature to about 150° C., particularly about 100° to 120° C. for at least about 5 hours, particularly for about 12 to 24 hours. It is also preferred that calcination be carried out by keeping the catalyst at a temperature of about 350° to 600° C., particularly about 400° to 550° C., for at least 3 hours, particularly about 12 to 24 hours. The alumina carrier may be dried in air and calcined in the atmosphere under the conditions described above. As a matter of course, the metals other that Ni and Mo can be deposited in a similar manner.

The amounts of the oxides of these active metals are such that the Group VI metals are used in an amount of 3 to 20 wt % and the Group VIII metals are used in an amount of about 0 to 5 wt %. The Group VI metals alone can be used. The catalyst is presulfurized prior to the hydrogenation of heavy oil. The presulfurization is conducted by subjecting hydrogen containing about 10% $H_2S$ or vacuum gas oil to a gradually rising temperature from room temperature to about 350° C. for about 2 or 3 days under hydrogen.

The hydrocracking and desulfurization of asphaltene and metal components in raw materials can be simultaneously carried out over a long period of time when heavy hydrocarbon oil is hydrogenated in the presence of the above catalyst of the present invention. The reaction conditions are such that the reaction temperature is from about 330° to 450° C., particularly about 350° to 420° C., most preferably about 360° to 410° C., the pressure is from about 80 to 200 kg/cm$^2$, particularly about 90 to 150 kg/cm$^2$, the liquid hourly space velocity is about 0.1 to 5 hr$^{-1}$, particularly about 0.1 to 2 hr$^{-1}$, and the feed ratio of hydrogen to raw oil is from about 500 to 2800 M$^3$/l.

Though the catalyst of the present invention can be used alone, it is preferred that the catalyst of the present invention be used in combination with a conventional desulfurization catalyst to allow the catalyst of the present invention to serve as a catalyst for the removal of metals before desulfurization. A conventional desulfurization catalyst is a compound in which Group VI metals and/or Group VIII metals are carried on a porous alumina carrier. The pore diameter of the alumina carrier is from about 70 to 110 Å, preferably from about 60 to 100 Å. The volume of the pores is from about 0.4 to 1.0 ml/g. The catalyst of the present invention plays a role as a catalyst for the hydrocracking of metal components and asphaltene in the raw material and for the protection of the desulfurization catalyst in the later stage. Metals formed by the hydrocracking are accumulated on the catalyst of the present invention and removed.

One feature of the catalyst of the present invention resides in that the catalyst of the present invention has a metal-receiving capacity larger than that of a conventional metal-removing catalyst and is a metal-removing catalyst of high metal-removing capacity.

Another feature of the catalyst compoisition of the present invention is that since the pore size of the micropores is almost the same as that of a conventional desulfurization catalyst, the present catalyst composition has a high desulfurizing effect, unlike a conventional metal-removing catalyst or the earlier descussed JP-A's metal-removing catalyst having 10 to 30% of large diameter passages.

Accordingly, heavy hydrocarbon oil containing sulfur, metals and/or asphaltene at high concentrations can be hydrogenated by a method where there is efficiently used a reactor in which the catalyst of the present invention is charged into the first stage thereof and the conventional desulfurization catalyst is charged into the latter stage thereof. Namely, the catalyst of the present invention is a high activity, long life metal-removing catalyst as well as a catalyst improved in desulfurization performance as compared to conventional metal-removing catalysts.

The catalyst composition of the present invention has specific catalytic physical properties so that it exhibits performance as an excellent bifunctional catalyst having functions as a conventional desulfurization catalyst and/or a conventional metal-removing catalyst. Hence, the life of the catalyst is greatly prolonged as compared with a conventional desulfurization catalyst. Further, the catalyst composition of the present invention has a prolonged life even when used in combination with a conventional desulfurization catalyst.

The present invention will now be illustrated in greater detail by reference to the following Examples and Comparative Examples. The evaluation of the catalyst compositions obtained in the Examples and Comparative Examples was done in the following manner.

Test for the evaluation of the relative activity of hydrodesulfurization

The evaluation of the relative activity of the hydrodesulfurization on Khafji topping residual oil was done by determining the sulfur content (wt %) and the metal removal ratio (%) (=(Metal content in Raw material (wt %)−Metal Content in Product (wt %))÷Metal content in Raw material (wt %)×100) of the reaction product on the 25th day of reaction using the catalyst (the sulfur content of the reaction product was low in the initial reaction stage, but the sulfur content increased and stabilized with the passage of time so that the sulfur content on the 25th day was used) using a fixed-bed reactor having an inner diameter of 14 mmΦ. The properties of the feedstock and test conditions were as follows.

Properties of feedstock (Khafji topping residual oil)

| Sulfur content | 4.21 wt % |
|---|---|
| Vanadium | 90 ppm |
| Nickel | 29 ppm |

Test conditions

| Reaction temperature, °C. | 410 |
|---|---|
| Reaction pressure, kg/cm$^2$ | 105 |
| Liquid hourly space velocity, hr$^{-1}$ | 1.0 |
| Hydrogen/oil, M$^3$/kl | 930 |

Durability test for the accumulation of metal

The durability test for the accumulation of metal was done using Boscan crude oil having an ultra-high metal content in place of Khafji topping residual oil. The evaluation of durability was done by the number of days (life) till the desulfurization activity in product oil was reduced to 20%, by desulfurization amount and by metal amount removed. The properties of the feedstock and test conditions were as follows.

Properties of feedstock (Boscan crude oil)

| Sulfur | 4.91 wt % |
|---|---|
| Vanadium | 1200 ppm |
| Nickel | 110 ppm |

Test conditions

| Reaction temperature | 395° C. |
|---|---|
| Reaction pressure | 105 kg/cm$^2$ |
| Liquid hourly space velocity | 0.5 hr$^{-1}$ |
| Hydrogen/oil | 930 M$^3$/kl |

Test on the relative life of hydrodesulfurization

The relative life test of hydrodesulfurization of Khafji topping residual oil was done using a fixed bed reactor having an inner diameter of 30 mmΦ. The effect of the reaction temperature on catalyst life was examined. The same feedstock as used for the relative activity test of hydrodesulfurization was used. The test conditions were such that the reaction pressure was 150 kg/cm$^2$, the liquid hourly space velocity was 0.5 hr$^{-1}$ and the hydrogen/oil ratio was 930 M$^3$/kl. The reaction temperature was controlled so that the sulfur content of the product oil was 0.6 wt %.

EXAMPLES 1 TO 4

6.4 l of distilled water was placed in a 20 liter container, and 1.89 g of an aqueous sodium aluminate solution (Na$_2$O$_3$ content: 17.4%, Al$_2$O$_3$ content: 22%) was added thereto to prepare 8.29 kg of a solution having an Al$_2$O$_3$ content of 5.0%. 21 g of an aqueous solution of 50% gluconic acid was added thereto, and the mixture was stirred. An aqueous solution of 8.4% aluminum sulfate was rapidly added thereto at room temperature until the pH of the solution reached 9.5.

After the resulting solution in the form of a white slurry was left to stand overnight in air to age, the solution was filtered by means of a Nutsche funnel to dehydrate it and the cake was washed with 0.2% aqueous ammonia in an amount of five times the amount of the solution (about 35 to 45 l). 25% aqueous ammonia was added to 3 kg of the resulting washed cake to adjust the pH of the cake to 12. The mixture was added to a 5 l flask equipped with a reflux condenser and heated with stirring at 95° C. for 20 hours to age. The resulting slurry was dehydrated by means of a Nutsche funnel and the cake was washed with 0.2% aqueous ammonia in an amount of five times the amount of the solution. The resulting washed cake was extruded into a quatrefoil cross sectional shape having an outer diameter of 1/20 inch. The extrudate was dried at 110° C. for 8 hours and calcined at 550° C. in a muffle furnace for 3 hours in air to obtain a γ-alumina carrier.

A solution of 29.5 g of ammonium paramolybdate (NH$_4$)$_6$Mo$_7$O$_{24}$·4H$_2$O dissolved in 300 ml of warm water (containing a small amount of aqueous ammonia) heated to 50° C. was added to 168 g of the molded γ-alumina carrier. After the mixture was left to stand for one hour in air, the mixture was heated with stirring on a water bath to allow water to evaporate. Heating was simply to boil. After the amount of water was reduced, the resulting material was dried in air at 100° C. in an air oven for 5 hours and then calcined at 500° C. in air in a muffle furnace for 8 hours.

31 g of nickel nitrate Ni(NO$_3$)$_2$·6H$_2$O was dissolved in 200 ml of distilled water and 40 ml of 28% ammonia water was added thereto with stirring. The resulting aqueous solution of a nickel ammonium complex salt was added to the calcined material. After the mixture was left to stand for one hour, the mixture was boiled with stirring on a water bath to evaporate water. After the amount of water was reduced, the resulting material was dried in an air oven at 100° C. for 5 hours and then calcined in a muffle furnace at 500° C. for 8 hours to prepare a catalyst.

The catalyst contained 12.0 wt % of MoO$_3$ and 4.0 wt % of NiO as active ingredients for hydrogenation.

Each of the catalysts of Examples 1 to 4 was obtained by changing the molding pressure in the extrusion of the cake into a quatrefoil form. The physical properties of the catalysts are shown in Table 1.

TABLE 1

| Catalyst | Ex. 1 | Ex. 2 | Ex. 3 | Ex. 4 |
|---|---|---|---|---|
| Total volume of pores (ml/g) | 0.67 | 0.59 | 0.68 | 0.71 |
| Mean pore diameter of micropores (Å) | 85 | 85 | 86 | 101 |
| Ratio of volume of pores having a pore size within ±25% of the mean pore diameter of micropores to volume of micropores (%) | 62 | 68 | 67 | 64 |
| Ratio of volume of macropores to total volume of pores (%) | 8.0 | 3.1 | 5.2 | 6.3 |
| Shape of extruded catalyst particle (cross section) | quatrefoil | quatrefoil | quatrefoil | quatrefoil |
| (mmΦ*[1] × mmL) | 1.3 × 3.5 | 1.3 × 3.5 | 1.3 × 3.5 | 1.3 × 3.5 |
| Ratio of outer surface area of extruded catalyst particle to volume thereof (mm$^2$/mm$^3$) | 4.8 | 4.8 | 4.8 | 4.8 |
| Longest distance from interior of extruded catalyst particle to outer surface thereof | 0.35 | 0.35 | 0.35 | 0.35 |

TABLE 1-continued

| Catalyst | Ex. 1 | Ex. 2 | Ex. 3 | Ex. 4 |
|---|---|---|---|---|
| (mm) | | | | |

*(1)Maximum outer diameter (cross section)

COMPARATIVE EXAMPLE 1 TO 5

The procedure of Example 1 was repeated except that the carrier was extruded into a column in Comparative Examples 1 and 2 and the carrier was extruded into a quatrefoil in Comparative Example 3 to prepare each catalyst having general physical properties for the desulfurization of topping residual oil.

The procedure of Example 1 was repeated except that the mean pore diameter of the micropores was that for a general metal-removing catalyst in Comparative Example 4.

Further, the procedure of Example 1 was repeated except that 20% of macropores only for diffusion was introduced and the carrier was extruded into a column in Comparative Example 5.

The physical properties of the catalysts of Comparative Examples 1 to 5 are shown in Table 2. In the same way as in the Examples, the catalysts of Comparative Examples 1 to 5 were tested. The results are shown in Tables 3 and 4. With regard to the relative life test of hydrodesulfurization, the catalysts of Comparative Examples 1 and 4 were subjected to this test. The results are shown in the FIGURE.

The catalysts of Comparative Examples 1 to 5 fulfill either one function of desulfurization activity or metal-removing activity, but do not meet the requirements of a bifunctional catalyst. They are also inferior with respect to catalyst life.

TABLE 2

| Catalyst | Comp. Ex. 1 | Comp. Ex. 2 | Comp. Ex. 3 | Comp. Ex. 4 | Comp. Ex. 5 |
|---|---|---|---|---|---|
| Total volume of pores (ml/g) | 0.58 | 0.64 | 0.62 | 0.69 | 0.50 |
| Mean pore diameter of micropores (Å) | 88 | 85 | 85 | 171 | 86 |
| Ratio of volume of pores having a pore size within ±25% of the mean pore diameter of micropores to volume of micropores (%) | 70 | 65 | 73 | 75 | 63 |
| Ratio of volume of macropores to total volume of entire pores (%) | 1.9 | 8.0 | 1.8 | 1.9 | 21.3 |
| Shape of extruded catalyst particle (cross section) | column | column | quatrefoil | quatrefoil | column |
| (mmΦ × mmL) | 1.6 × 3.5 | 1.6 × 3.5 | 1.3*(1) × 3.5 | 1.3*(1) × 3.5 | 1.6 × 3.5 |
| Ratio of outer surface of extruded catalyst particle to volume thereof (mm²/mm³) | 3.1 | 3.1 | 4.8 | 4.8 | 3.1 |
| Longest distance from interior of extruded catalyst particle to outer surface thereof | 0.80 | 0.80 | 0.35 | 0.35 | 0.80 |

TABLE 2-continued

| Catalyst | Comp. Ex. 1 | Comp. Ex. 2 | Comp. Ex. 3 | Comp. Ex. 4 | Comp. Ex. 5 |
|---|---|---|---|---|---|
| (mm) | | | | | |

*(1)Maximum outer diameter (cross section)

The test results on the evaluation of the relative activity of the hydrodesulfurization of the catalysts of Examples 1 to 4 and Comparative Example 1 to 5 are shown in Table 3. The results of durability testing on the accumulation of metal are shown in Table 4. The FIGURE is a graph showing the results of the relative life test of hydrodesulfurization for the case when the catalyst of Example 1 is used in combination with the catalyst of Comparative Example 1 (general desulfurization catalyst for topping residual oil) (volume ratio: 40/60), the case where the catalyst of Comparative Example 1 is used and the case where the catalyst of Comparative Example 1 is used in combination with the catalyst of Comparative Example 4 (volume ratio of Comp. Ex. 4/Comp. Ex. 1 = 40/60).

TABLE 3

| Catalyst | Sulfur content of product oil (wt. %) | Metal removal rate (%) |
|---|---|---|
| Ex. 1 | 2.0 | 51 |
| Ex. 2 | 1.7 | 50 |
| Ex. 3 | 1.8 | 51 |
| Ex. 4 | 2.0 | 51 |
| Comp. Ex. 1 | 1.5 | 35 |
| Comp. Ex. 2 | 2.2 | 46 |
| Comp. Ex. 3 | 1.5 | 37 |
| Comp. Ex. 4 | 2.5 | 49 |
| Comp. Ex. 5 | 2.7 | 50 |

TABLE 4

| Catalyst | Life till desulfurization rate is reduced to 20% (days) | Amount of desulfurization till end of life (g/ml of catalyst) | Amount of metal removed till end of life (g/ml of catalyst) |
|---|---|---|---|
| Ex. 1 | 46 | 11.2 | 0.46 |
| Ex. 2 | 35 | 10.6 | 0.39 |
| Ex. 3 | 42 | 11.4 | 0.41 |
| Ex. 4 | 47 | 11.1 | 0.46 |
| Comp. Ex. 1 | 10 | 3.1 | 0.086 |
| Comp. Ex. 2 | 22 | 5.7 | 0.18 |
| Comp. Ex. 3 | 16 | 5.6 | 0.15 |
| Comp. Ex. 4 | 28 | 7.0 | 0.29 |
| Comp. Ex. 5 | 48 | 8.7 | 0.42 |

The catalysts of Examples 1 to 4 exhibit high activity with regard to desulfurization activity as well as metal removal activity and have excellent performance as bifunctional catalysts. Further, they have a much longer life than that of the catalyst (Comp. Ex. 4) which is conventionally used as a metal removing catalyst for topping residual oil and they have a long life equal to that of the metal removing catalyst (Comp. Ex. 5) having 21.3% macropores. Further, the catalyst of Example 1 exhibits high desulfurization activity in combination with a general desulfurization catalyst (Comp. Ex. 1). Thus, the reaction temperature can be lowered. Further, durability on the accumulation of metal can be improved and the catalysts of the invention have a very long life.

While the invention has been described in detail and with reference to specific embodiments thereof, it will be apparent to one skilled in the art that various changes and modifications can be made therein without departing from the spirit and scope thereof.

What is claimed is:

1. A catalyst composition for the hydrogenation of heavy hydrocarbon oil, characterized by that the catalyst composition comprises at least one active ingredient for hydrogenation supported on a porous alumina carrier and has the following characteristics:
   (1) the total volume of the pores is from 0.4 to 1.0 ml/g;
   (2) the mean pore diameter of pores having a pore diameter of from 5 to 400 Å is from 60 to 140 Å;
   (3) the volume of pores having a pore size within ±25% of the mean pore diameter of pores having a pore diameter of from 5 to 400 Å is from 60 to 98% of the volume of pores having a pore diameter of from 5 to 400 Å;
   (4) the volume of pores having a pore diameter of from 400 to 5000 Å is from 2 to 9% of the total volume of the entire pores;
   (5) the ratio (mm$^2$/mm$^3$) of the outer surface area of a molded catalyst particle to the volume thereof is from 4 to 8; and
   (6) all points in the interior of the molded catalyst particle are positioned within 0.05 to 0.6 mm from the outer surface thereof.

2. A catalyst composition for the hydrogenation of heavy hydrocarbon oil as in claim 1, wherein the total volume of the pores is at least 0.4 ml/g but not larger than 1.0 ml/g.

3. A catalyst composition for the hydrogenation of heavy hydrocarbon oil as in claim 1, wherein the mean pore diameter of pores having a pore diameter of not greater than 400 Å is from 70 to 100 Å.

4. A catalyst composition for the hydrogenation of heavy hydrocarbon oil as in claim 1, wherein the mean pore diameter of pores having a pore diameter of not greater than 400 Å is from 90 to 140 Å.

5. A catalyst composition for the hydrogenation of heavy hydrocarbon oil as in claim 1, wherein the volume of pores having a pore diameter of not less than 400 Å is from 3 to 9% of the total volume of the entire pores.

6. A catalyst composition for the hydrogenation of heavy hydrocarbon oil as in claim 1, wherein all points in the interior of the molded catalyst particle are positioned within 0.5 mm from the outer surface thereof.

7. A catalyst composition for the hydrogenation of heavy hydrocarbon oil as in claim 1, wherein the active ingredient for hydrogenation is a metal component supported on the porous alumina carrier which comprises at least one member selected from the group consisting of metals of Group VI of the Periodic Table or compounds of said metals.

8. A catalyst composition for the hydrogenation of heavy hydrocarbon oil as in claim 1, wherein the active ingredient for hydrogenation is a metal component supported on the porous alumina carrier which comprises at least one member selected from the group consisting of metals of Group VI of the Periodic Table or compounds of said metals and at least one member selected from the group consisting of metals of Group VIII of the Periodic Table or compounds of said metals.

9. A catalyst composition for the hydrogenation of heavy hydrocarbon oil as in claim 7 or 8, wherein the amount of the active metal selected from Group VI of the Periodic Table is from 3 to 20 wt % in terms of metal oxide.

10. A catalyst composition for the hydrogenation of heavy hydrocarbon oil as in claim 8, wherein the amount of the active metal selected from Group VIII of the Periodic Table is from 0 to 5 wt % in terms of metal oxide.

11. A catalyst composition for the hydrogenation of heavy hydrocarbon oil as in claim 7 or 8, wherein the active metal selected from Group VI of the Periodic Table is chromium, molybdenum or tungsten.

12. A catalyst composition for the hydrogenation of heavy hydrocarbon oil as in claim 8 or 10, wherein the active metal selected from Group VIII of the Periodic Table is iron, cobalt, nickel or platinum.

13. A catalyst composition for the hydrogenation of heavy hydrocarbon oil as in claim 1, wherein the heavy hydrocarbon oil is topping residual oil or a vacuum residue of crude oil; synthetic oil obtained by subjecting oil shale, tar sand or bitumen to extraction; desulfurized heavy oil obtained by directly treating crude oil in a desulfurizing apparatus; deasphalted oil obtained by treating crude oil in a solvent deasphalting apparatus; product oil obtained from the liquefaction of coal, or a residual oil obtained from these processes or a mixture of the above oils.

14. A process for producing a catalyst composition for the hydrogenation of heavy hydrocarbon oil as claimed in claim 1, which comprises preparing a catalyst which comprises an active component supported on a porous alumina carrier which has the following characteristics:
   (1) the total volume of pores is from 0.4 to 1.0 ml/g;
   (2) the mean pore diameter of pores having a pore diameter of from 5 to 400 Å is from 60 to 140 Å;
   (3) the volume of pores having a pore size within ±25% of the mean pore diameter of pores having a pore diameter of from 5 to 400 Å is from 60 to 98% of the volume of pores having a pore diameter of from 5 to 400 Å;
   (4) the volume of pores having a pore diameter of from 400 to 5000 Å is from 2 to 9% of the total volume of the entire pores;
   (5) the ratio (mm$^2$/mm$^3$) of the outer surface area of a molded catalyst particle to the volume thereof is from 4 to 8; and
   (6) all points in the interior of the molded catalyst particle are positioned within 0.05 to 0.6 mm from the outer surface thereof.

15. A process for producing a catalyst composition for the hydrogenation of heavy hydrocarbon oil as in claim 14, wherein the total volume of the pores is at least 0.4 ml/g but not more than 1.0 ml/g.

16. A process for producing a catalyst composition for the hydrogenation of heavy hydrocarbon oil as in claim 14, wherein the mean pore diameter of pores having a pore diameter of not greater than 400 Å is from 70 to 100 Å.

17. A process for producing a catalyst composition for the hydrogenation of heavy hydrocarbon oil as in claim 14, wherein the mean pore diameter of pores having a pore diameter of not greater than 400 Å is from 90 to 140 Å.

18. A process for producing a catalyst composition for the hydrogenation of heavy hydrocarbon oil as in claim 14, wherein the volume of pores having a pore diameter of not less than 400 Å is from 3 to 9% of the total volume of the entire pores.

19. A process for producing a catalyst composition for the hydrogenation of heavy hydrocarbon oil as in claim 14, wherein all points in the interior of the molded catalyst particle are positioned within 0.5 mm from the outer surface thereof.

20. A process for producing a catalyst composition for the hydrogenation of heavy hydrocarbon oil as in claim 14, wherein the active component is an active metal component supported on the porous alumina carrier which comprises at least one member selected from the group consisting of metals of Group VI of the Periodic Table or compounds of said metals.

21. A process for producing a catalyst composition for the hydrogenation of heavy hydrocarbon oil as in claim 14, wherein the active metal component supported on the porous alumina carrier comprises at least one member selected from the group consisting of metals of Group VI of the Periodic Table or compounds of said metals at least one member selected from the group consisting of metals of Group VIII of the Periodic Table or compounds of said metals.

22. A process for producing a catalyst composition for the hydrogenation of heavy hydrocarbon oil as in claim 20 or 21, wherein the amount or the active metal selected from Group VI of the Periodic Table is from 3 to 20 wt % in terms of metal oxide.

23. A process for producing a catalyst composition for the hydrogenation of heavy hydrocarbon oil as in claim 21, wherein the amount of the active metal selected from Group VIII of the Periodic Table is from 0 to 5 wt % in terms of metal oxide.

24. A process for producing a catalyst composition for the hydrogenation of heavy hydrocarbon oil as in claim 20 or 21, wherein the metal selected from Group VI of the Periodic Table is chromium, molybdenum or tungsten.

25. A process for producing a catalyst composition for the hydrogenation of heavy hydrocarbon oil as in claim 21, wherein the metal selected from Group VIII of the Periodic Table is iron, cobalt, nickel or platinum.

26. A process for producing a catalyst composition for the hydrogenation of heavy hydrocarbon oil as in claim 14, wherein said pores (4) having a pore diameter of not less than 400 Å are formed by adding an additive selected from the groups consisting of carbon black, wheat flour, corn starch, rubber and a synthetic resin during molding, and firing to remove the additive and to form 2 to 9% of said pores (4) having a pore diameter of not less than 400 Å.

27. A process for producing a catalyst composition for the hydrogenation of heavy hydrocarbon oil as in claim 14, wherein said pores (4) having a pore diameter of not less than 400 Å are formed by previously molding catalyst or carrier particles containing only pores having a pore diameter of about 60 to 140 Å, crushing the particles into powders having an appropriate particle size and remolding the powders to form 2 to 9% of said pores (4) having a pore diameter of not less than 400 Å by spaces between particles.

28. A process for producing a catalyst composition for the hydrogenation of heavy hydrocarbon oil as in claim 14, wherein said pores (4) having a pore diameter of not less than 400 Å are formed by controlling the pressure applied to aluminum hydroxide powder serving as a precursor or said powder containing said active conponent which is an active metal for hydrogenation during molding to from 2 to 9% of said pores (4) having a pore diameter of not less than 400 Å.

* * * * *